(12) United States Patent
McKinney et al.

(10) Patent No.: US 7,693,530 B1
(45) Date of Patent: Apr. 6, 2010

(54) RANGING RESOURCE ALLOCATION FOR WIRELESS DEVICES IN NETWORKS PROVIDING ACCESS BY WI-MAX AND LIKE PROTOCOLS

(75) Inventors: David U. McKinney, Olathe, KS (US); Tim L. Swan, Lee's Summit, MO (US); John E. Belser, Olathe, KS (US)

(73) Assignee: Clear Wireless LLC, Kirkland, WA (US)

( * ) Notice: Subject to any disclaimer, the term of this patent is extended or adjusted under 35 U.S.C. 154(b) by 619 days.

(21) Appl. No.: 11/731,670

(22) Filed: Mar. 30, 2007

(51) Int. Cl.
*H04B 7/00* (2006.01)
(52) U.S. Cl. .................................. 455/510; 370/432.3
(58) Field of Classification Search ................ 455/510, 455/435.1, 434, 456.2; 370/432.3
See application file for complete search history.

(56) References Cited

U.S. PATENT DOCUMENTS 7,024,217 B2    4/2006  Hunzinger ................... 455/510

2005/0096064 A1*   5/2005  Hunzinger ................ 455/452.2

OTHER PUBLICATIONS

"Mobile WiMAX-Part 1: A technical Overview and Performance Evaluation", WiMAX Forum (Aug. 2006).

* cited by examiner

*Primary Examiner*—Tu X Nguyen
(74) *Attorney, Agent, or Firm*—McDonnell Boehnen Hulbert & Berghoff LLP (57) ABSTRACT

A radio access network dynamically compiles history data regarding mobile wireless devices that tend to fail successful ranging, e.g., establishment of Layer 1 communication with a radio access node or base station. The history data is obtained from messages sent from the mobile device to the network which contain a count indicating the number of times the device has failed a ranging attempt. If the history (or count) data indicates that a wireless device has experienced ranging failures exceeding a threshold number of failures, the base station responsively blocks the device from attempting any additional ranging for a period of time. The period of time can be short-term period of time or a long term period of time. The methods avoid excessive use of air interface resources by excluding wireless devices which are unable to successfully range. That is, "bad" or "problem" wireless devices are excluded from access to the network.

13 Claims, 6 Drawing Sheets

RANGING RESOURCE ALLOCATION FOR WIRELESS DEVICES IN NETWORKS PROVIDING ACCESS BY WI-MAX AND LIKE PROTOCOLS

BACKGROUND

A. Field

This invention relates to the art of wireless telecommunications between wireless devices and a base station, and more particularly to methods efficient management of network resources at the base station during ranging between the wireless device and the base station.

B. Related Art

In the wireless telecommunications art, there are known communications protocols by which mobile wireless devices may access a network of a wireless service provider. These include CDMA and GSM, of which persons skilled in the art are familiar.

Wireless service providers are developing additional technologies by which wireless devices may access their network. These include WiMAX (Worldwide Interoperability for Microwave Access), a broadband wireless access protocol based on the IEEE 802.16 standard, including extensions such as 802.16a, 802.16b, and 802.16e.

WiMAX chipsets which provide for communication in accordance with the WiMAX protocol are becoming increasingly prevalent as standard or optional equipment not only in traditional wireless communications devices, such as cellular phones and personal digital assistants, but also in devices which, heretofore, were not used for access to telephony networks. These devices include portable music players, entertainment devices such as game players, automobiles, domestic appliances and so on. It is expected that by the year 2009 there will be in excess of 100 million devices in use which have WiMAX chipsets in them. Thus, a virtual explosion of the number of WiMAX devices is expected to occur in the near future.

When WiMAX devices are turned on, a ranging process typically occurs by which the devices seek to establish a physical layer connection with a radio access node (referred to herein interchangeably as a base station) in a network which provides connectivity for the WiMAX device to either other WiMAX devices or a node on a computer network (e.g. Internet, or wireless service provider network). The possibility of millions of WiMAX devices all contending for limited resources in terms of radio access nodes presents acute problems of resource allocation on the network side. Furthermore, from a business standpoint, there is a desire to keep WiMAX technology simple and cheap and thus a solution to the resource allocation problem is preferably one that keeps cost to a minimum and avoids, to the extent possible, the deployment of additional radio access nodes.

To understand the resource allocation problem in more detail, it is helpful to provide additional background discussion of the ranging process by which WiMAX devices establish this physical layer connection with a base station.

Briefly, when a WiMAX device (chipset) starts up there is an initial system acquisition step in which the device is pre-programmed to look at a particular frequency, in search of a "preamble" that they can decode. The preamble is a signal broadcast from a base station and represents a particular base station. Thus, once the device finds the preamble, it has found a WiMAX base station.

After this initial step has occurred, a ranging step occurs in which the device asks for resources from the base station. This process functions to get OSI reference model Layer 1 (physical layer) connectivity and synchronization. It involves several messages passing between the base station and the device, to find a proper power level, frequency, timing (synchronization) and perhaps other parameters that will be used for communication between the device and base station. It also involves giving the network information about the device, negotiating with the network, and giving the network the device's Medium Access Control (MAC) identity so as to then facilitate higher layer communications.

More specifically, in the ranging step the WiMAX device that receives a preamble signal then tries to establish connectivity with the base station that issued the preamble signal. To do so, the WiMAX device sends to the base station an initial ranging request, in which the device provides (i) a MAC ID of the device, (ii) a ranging request subheader—to identify the message as a ranging request-type message, and (iii) PDU—i.e., a payload block, usable for anything. The device transmits this ranging request at a particular power level and with particular timing. The device then waits for a ranging response message from the base station.

If the device does not receive a ranging response, it will then ramp up its transmission power and send a new ranging request to the base station. It will keep doing this until it gets a ranging response from the base station.

The device may receive a ranging response from the base station that tells the device to adjust its power and timing in some manner. The device will then make the adjustment and send a new ranging request to the base station using the adjusted parameters. This back and forth process will continue until the base station is satisfied.

When the base station is satisfied with the power and timing parameters used by the device, the base station will send to the device a ranging response that specifies those power and timing parameters as initial parameters the device should use when it engages in session establishment communication, etc.

Note that, in practice, multiple devices may contend for use of a common set of resources. Thus, this process of assigning a device to an initial set of power/timing parameters is an effort by the base station to focus the device's operation in a way that will not interfere too much with other WiMAX devices but that are still sufficient to facilitate proper operation.

Note also that the timing synchronization process involves getting alignment between what the device is sending/receiving and what the base station is sending/receiving. The specifics of timing synchronization and power setting (and thus the specifics of how the base station would or would not be satisfied with the settings in a given instance) are defined in the WiMAX standard and are not at all critical to the present invention.

After the base station has sent the ranging response message, the base station then sends an "Uplink MAP" (UL-MAP) message to the WiMAX device. This message tells the device that ranging is done, and it moves the device from contention-based RF space to dedicated RF space. That is, the base station now has full control over the communication with the device. In an orthogonal frequency division multiple access (OFDMA) system like WiMAX, the base station gives the device a specific frequency, bandwidth, a specific timeslot, and specific coding (like CDMA) to use for communication. The base station provides that information to the WiMAX device in the UL-MAP message. This establishes a dedicated channel (called a "sub-channel") between the base station and the device.

After this occurs, the WiMAX device then sends a response/ack message back to the base station. At this point, the device has not yet registered with the network, e.g., undergone authentication or higher application levels in the OSI reference model. Rather, the ranging process establishes the OSI Layer 1 (RF) settings for communication. After the ranging step is completed, the device enters a session establishment step. This step occurs at Layer 2 of the OSI reference model and higher levels. This could involve the device registering with the network, registering with application servers, services, etc.

All of the ranging activity to accomplish a setting of the Layer 1 parameters consumes significant base station resources. That is fine if the ranging process works. However, if failures (particularly repeated failures) occur in the ranging process, it could be a problem, as more and more base station resources are then consumed, which could preclude other important uses of the resources. Thus, in a cell serving a large number of WiMAX devices, such as in an urban area, airport, shopping mall, or other type of location, a large number of WiMAX devices (devices having embedded WiMAX chipsets) may carry out this ranging process and thus consume base station resources, even without ever becoming registered with the network. This presents significant resource allocation problems for WiMAX base stations.

Moreover, an entity that provides WiMAX base station services, such as wireless communication service provider like Sprint Nextel or Verizon, may face the situation where devices that the service provider wants to be able to access its network (i.e., its subscribers) will be contending for base station resources with devices that the service provider does not want to have access to its network, i.e., non-subscribers. Therefore, there is a need in the art for ways of handing ranging request messages for large populations of WiMAX devices which impose less demands on base station resources, both in terms of consumption of available spectrum and processing power at the base station.

SUMMARY

The following embodiments and aspects thereof are described and illustrated in conjunction with systems, tools and methods which are meant to be exemplary and illustrative, not limiting in scope.

In brief, a radio access network dynamically compiles history data regarding wireless devices that tend to fail successful ranging, e.g., establishment of Layer 1 communication with a radio access node or base station. In one example, the history data is obtained from messages sent from the wireless device to the network which contain a count indicating the number of times the device has failed a ranging attempt. If the history (or count) data indicates that a wireless device has experienced ranging failures exceeding a threshold number of failures, the base station responsively blocks the device from attempting any additional ranging for a period of time. The period of time can be a short-term period of time or a long term period of time. The methods avoid excessive use of air interface resources by excluding wireless devices which are unable to successfully range. That is, "bad" or "problem" wireless devices are excluded from access to the network. Further, the wireless device could be excluded based on its address alone, for example in the case where a device with a known address has previously experienced multiple failures, or possibly for other reasons such as it is used by a person who is not a subscriber of wireless services.

One form of the invention may take the form of a method for controlling access by a wireless device to a communications network. The devices communicate with the network via a wireless access protocol, which may be WiMAX or some other protocol. The method includes the steps receiving a ranging request from the device at a base station. The ranging request includes a count (referred to as "Ecount" below") of the number of times the device has sent a ranging request to the communications network and such ranging request resulted in a ranging failure. The method further includes a step of the base station sending a ranging response to the device depending on the count or alternatively based on the address (e.g., MAC address) of the device.

In one possible example, the response to the ranging request includes a command to the wireless device to stop transmitting additional ranging requests for a short term period. This message may for example be sent if the Ecount is say 5 or 10, indicating it is having some current ranging difficulty, e.g., out of range or is having some other problem. The term "short term period" is defined for purposes of this disclosure as a period of time of less than one hour. In another example, the response to the ranging request includes a command to the device to stop transmitting additional ranging requests for a long term period. The term "long-term period" is defined for purposes of this disclosure as a period of time of one hour or greater. The long term period could, for example, prevent the device from sending additional ranging requests for the next hour, day, week or even long period, including permanently. This response might be sent if the mobile device has a high Ecount value or is in a "blacklist" of devices with known history of experiencing excessive numbers of ranging failures. As another example, if the device has had consistent success in ranging and has a low Ecount, then the response to the ranging request may include a command to the mobile device to continue ranging. In this particular example, the mobile device operates clears the Ecount to zero in response to the command to continue ranging.

In another possible embodiment, the method further includes a step of dynamically establishing a blacklist of devices based on Ecounts associated with the devices received by one or more base stations in the communications network. For example, the network keep tracks of the devices with "high" Ecounts and places them in a blacklist database. The database is searchable by the Medium Access Control (MAC) address or other identifying data for the devices. In some embodiments, the blacklist takes the form of a system-wide blacklist which is applicable (i.e., used or accessed by) all base stations in the communications network. When the base station receives a MAC address and Ecount from the device, they can send the ranging response message either by looking at the Ecount or looking up the MAC address in the database.

In another aspect, an improvement to a wireless communications device is disclosed having a machine-readable memory. The device could take the form of any device which conducts ranging with a base station in a wireless network, for example any device or thing which includes a WiMAX chipset. The improvement takes the form of a memory in the device which stores a count of the number of times the device has sent a ranging request message to the communications network and such ranging request resulted in a failure. The device further includes processing instructions for clearing the count to zero in response to a message received from a base station in a communications network.

In another example, the method takes the form of an improvement to a wireless communications network. The improvement includes providing a ranging error management system (REMS) including a computing platform and a ranging error data store in the network. The ranging error management system is operative to send commands to mobile devices to thereby cause the wireless devices to limit their ability to send ranging request messages to base stations in the communications network. In one possible configuration, the ranging error management system is incorporated into a base station in the wireless communications network. In another embodiment, the ranging error management system is centralized and coupled to the base stations over a computer network, such as a wireless service provider backbone network or the Internet.

In one possible configuration, the data store stores a blacklist of wireless devices for which the ranging error management system is operative to send commands to wireless devices via the base stations to stop ranging for either a short term or a long term period.

In addition to the exemplary aspects and embodiments described above, further aspects and embodiments will become apparent by reference to the drawings and by study of the following detailed descriptions.

DETAILED DESCRIPTION OF PREFERRED EMBODIMENTS

This disclosure relates to methods and systems for limiting the ability of wireless devices to transmit ranging request messages in a wireless network. The method is applicable to various different wireless protocols, and the embodiments below use WiMAX as a non-limiting example.

Figure 1:
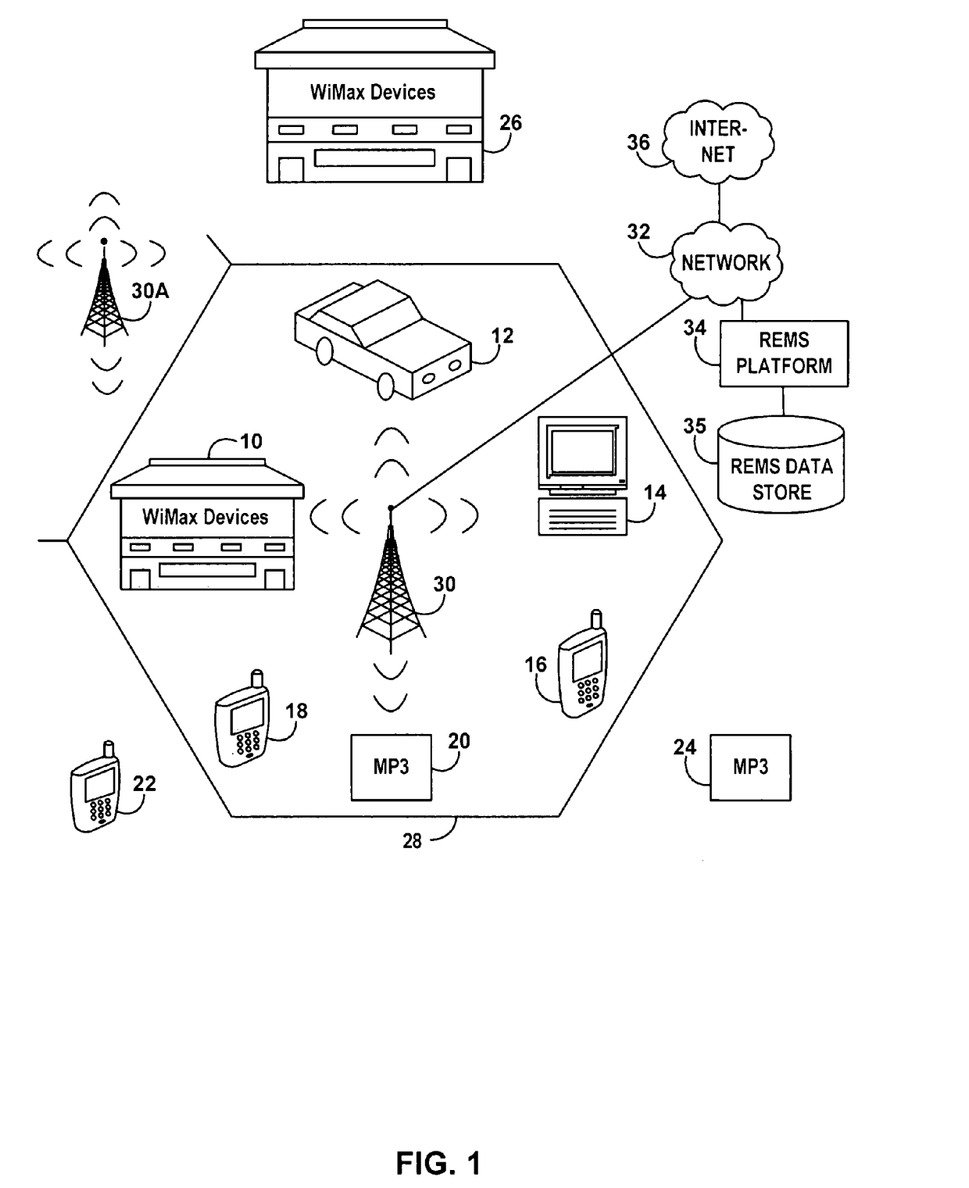
FIG. 1 is a schematic representation of a coverage area of a WiMAX base station showing a plurality of WiMAX devices competing for resources of the WiMAX base station.

FIG. 1 is schematic representation of a coverage area of a WiMAX base station 30 showing a plurality of WiMAX devices competing for ranging resources of the WiMAX base station 30. The devices may consist, for example, of WiMAX devices located in a building or home 10, such as computer, appliance or cell phone, WiMAX device located in an automobile 12, a portable computer 14, a cellular telephone 16, a personal digital assistant 18, an MP3 player 20, another cell phone 22, another MP3 player 24 and various WiMAX devices located within an office building 26 such as computers, cell phones, game players, etc. The base station 30 has a coverage area indicated by the hexagon 28. Adjacent areas are covered by other base stations, one of which is shown as base station 30A.

One or more of the devices 10, 12, 14, 16, 18, etc. may be experiencing a difficulty in successfully establishing Layer 1 communications with the base station 30. Accordingly, there needs to be a method of identifying such "problem" devices and preventing them, either for a short term or long term basis, from transmitting additional ranging request messages so as to allow the base station to devote its limited resources (and air resources as well) to non-"problem" devices. This disclosure achieves this in several ways, including the transmission of "Ecounts" from the devices to the base station 30 and by the use of a ranging error management system which uses the Ecounts to block the "problem" devices from further ranging. The ranging error management system (REMS) includes a computer platform 34 (conventional) and a REMS data store 35 which stores both real time data, e.g., Ecounts, wireless device power levels, timer values and other information, as well as non-real time data, such as "blacklists" of devices which are to be prevented from sending additional ranging messages. The REMS platform 34 and datastore 35 are coupled to a network 32. The network 32 could take the form of a wireless service provider backbone network. The network 32 could be coupled to any IP network such as the Internet 36.

Heretofore, there apparently was no known method for identifying ranging failures and failure modes (e.g., failing multiple times, failing every time, etc.) of devices 12, 14, etc. and having the base station 30 or a node on the network 32 take action responsively. This disclosure provides for methods for detecting ranging failures and failure modes, and having either the base station 30 or the REMS platform 34 take action to reduce those types of failures from occurring in the future. The action could be telling the devices prone to ranging failure to permanently stop ranging, or it could be telling the device to stop ranging for a period of time. Other actions are possible as well. In example practice, the device 12, 14 etc. could flag its own failures and the network could check the device's failure history and react accordingly.

This goal is achieved by having the device 12 inserts a count value ("Ecount") into every ranging request that the device sends to a base station 30. The count indicates the number of times the device has sent a ranging request to the base station 30 and failed to complete the ranging, for whatever reason. The device increments it by one once each time it sends a new ranging request to the base station. The device will restart the Ecount parameter each time it begins ranging.

The communications network tracks the Ecounts, either in the base station 30 or in the REMS platform 34. In one embodiment, the base station 30 keeps a history of the Ecounts over time for all mobile devices that attempt to range with it. (The REMS 34/35 can be implemented in the base station). In other variations, the Ecounts are forwarded to a separate REMS platform 34 as shown in FIG. 1. The REMS platform maintains in a data store 35 a set of data that correlates ranging errors (e.g., Ecounts) with MAC addresses of the devices 12, 14 etc. The base station or REMS platform may track the Ecounts by other identifying information besides MAC address.

The REMS applies error management logic which is keyed to the Ecount history. For example, the REMS will apply blacklist logic that will indicate the base station should not communicate with particular MAC addresses (i.e., particular devices), so that the base station 30 should not respond to ranging requests from such addresses. The term "blacklist" in the verb sense refers to the action of restricting at least in part the ability of the device 12 to conduct additional ranging, and in the noun sense to a list which identifies devices subject to such a restriction. The same instructions may be applied to the other base stations 30A. In other words, the blacklist may be global and shared to all the base stations in the network. The base station 30 may be statically provisioned with the blacklist (e.g., by manual setup) and/or the base station may more preferably establish the blacklist dynamically over time, as a result of the occurrence of particular ranging problems. The base station 30 may maintain a set of blacklist data keyed to particular MAC addresses.

In the example of static provisioning of blacklist data, the WiMax carrier (operator of base station 30 and network 32) could know in advance of specific ranges of MAC addresses (e.g., for particular types of devices) that should be blacklisted and so might provision those MAC addresses into the blacklist. Such static provisioning could further indicate the extent of blacklisting to apply on a per MAC address basis. For instance, certain MAC addresses may be blocked only for a specified period of time or at specified times (e.g., days, times of day, etc.), while certain other MAC addresses may be permanently blocked from ranging.

In the example of dynamic provisioning of blacklist data, base station 30 (or REMS platform 34) may detect a threshold number or rate of failed ranging attempts over time (i.e., historically) by a particular MAC address. If a given device 12 has a particular threshold number or rate of failed ranging attempts over time, then the base station may automatically add that MAC address to the blacklist. The blacklist logic may indicate the extent (time) of blacklisting to apply, depending on the extent of failures by the MAC address. For instance, a first threshold may specify that the MAC address should be blocked for a short term period of time (or at certain times/days, etc.) from further ranging, while a higher threshold may specify that the MAC address should be blocked from ranging for a longer period of time, e.g., permanently.

When one of the devices 12, 14, 16 etc. sends a ranging request message, the message is forwarded to the REMS system 34 and 35. The REMS system will update the ranging history data for the device in the REMS data store 35. In response to the ranging request and in particular the Ecount information contained in the request, the REMS could instruct the base station 30 to allow the ranging request. For example, the REMS platform 34 could determine that the device 12 is not blacklisted and need not be blacklisted. Upon successful ranging, the base station 30 would preferably tell the device in a ranging response message to clear its ECOUNT counter and proceed on to session acquisition (Layer 2 and higher layers in the OSI reference model).

Alternatively, based on the Ecount, the REMS could dynamically add the device 12 to the blacklist stored in the data store 35. The REMS platform 34 could responsively look at the ECOUNT history for that MAC address and, pursuant to the blacklisting logic, decide then to blacklist the device on either a short term or long term basis. The base station would then send a ranging response to the device that includes a command to stop ranging. The REMS add the device's MAC address to the blacklist and specifying the extent of blacklisting for the device (short term or long term).

This dynamic blacklisting could apply in a scenario where a device is failing ranging attempts a lot in the current series of ranging attempts, which could be due to bad air interface conditions, for instance. In this situation, it is reasonable for the base station to tell the device in that instance to back off for a short time (i.e., to stop ranging for a specified finite period of time).

If the mobile device 12 is already listed in the blacklist in the data store 35 and receives another ranging request (e.g., because the short term pause in ranging has expired), the base station may send a ranging response to the device that commands the device to continue to pause ranging either for another new short term period or for a long term period, and the blacklist in the data store 35 is updated accordingly. This application of an existing blacklist will probably occur where the device has a demonstrated history of failed ranging requests, more substantial than just in the current set of ranging attempts. In other words, the REMS platform 34 may look to prior blacklist history in determining whether to allow the device to range or to upgrade a blacklist for a device.

For a blacklisted device (whether already blacklisted or being blacklisted on the fly), the base station 30 preferably sends a ranging response to the device 12, telling the device to not send further ranging requests to the base station 30 for a particular specified duration as dictated by the blacklisting logic. While the response message is referred to herein as a "ranging response" message, the response message may not constitute a traditional ranging response in that it does not tell the device anything about the device's proposed power/timing but rather tells the device to stop ranging. As such, the response message may need to be defined by an extension of the WiMAX or other protocol defining communications between the mobile devices and the base station. The ranging response message sent to the mobile device provides instructions/commands in the PDU (payload block) of a message to the device. Such commands could take the form of setting a flag or bit in the payload block indicating that the device is to clear its Ecounter, increment its Ecounter, and stop ranging, and also a stop ranging timer value, or in some other form the details of which are not particular important.

FIGS. 2 and 2A-2C are diagrams showing the flow of messages between a WiMAX device 12 and the base station 30 of FIG. 1, and between the base station 30 and the REMS platform 34 and data store 35 of FIG. 1 in one possible example of how the invention might be implemented.

Figure 2:
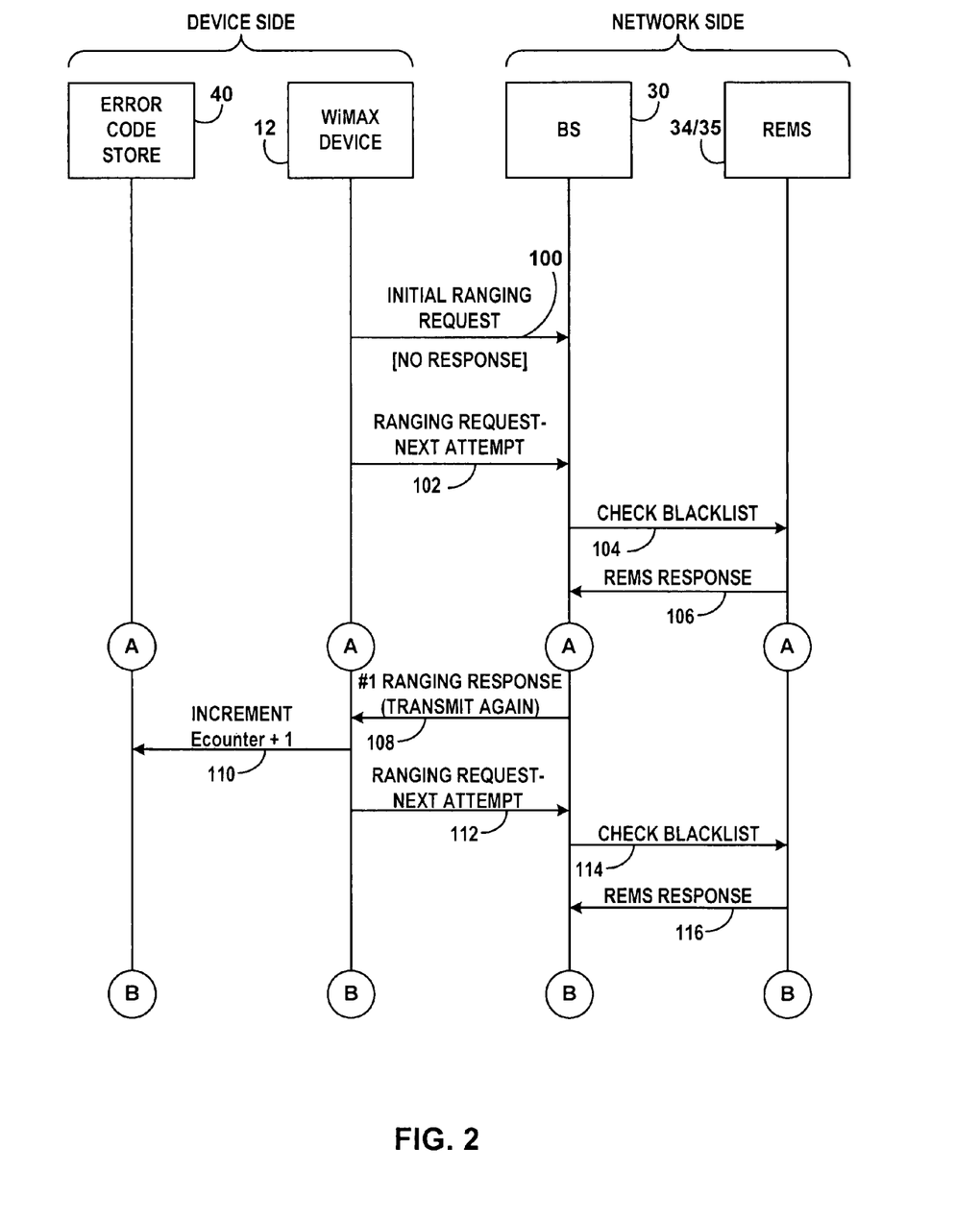
FIGS. 2 and 2A-2C are diagrams showing the flow of messages between a WiMAX device and the base station of FIG. 1, and between the base station and the REMS server of FIG. 1.

The device 12 includes a local error code store 40 where Ecount values are stored in memory locally on the device 12.

When the WiMAX chipset of the device 12 is powered on, it sends an initial ranging request message 100 to the base station 30. The Ecount value in the error code store 40 is initially set to zero on power up.

Suppose that initial ranging request 100 is not responded to. The failure to receive a response could be due to myriad reasons, such as power lever too low, software error, out of range, etc. The Error code store increases the Ecount to 1.

The device 12 then sends a new ranging request message, shown as 102. This ranging request message includes the device 12 MAC address and the Ecount value of 1.

The base station forwards the MAC address and Ecount value to the REMS platform to check to see of the device 12 is on a blacklist. The REMS platform consults the blacklist in the datastore 35 and sends back a response, e.g. the device is or is not on a black list and if so the terms (e.g., duration, timer values, etc.). This point in the process is shown as point A, which is referred to in FIGS. 2A-2C.

At point A, the base station may transmit one of several messages, depending on the blacklist status of the device 12.

As shown at 108, if the device is not in a blacklist but the device has failed ranging due to timer or power level issues, the base station could send a first ranging response message that basically asks the device 12 to transmit a new ranging response in accordance with new timing or power settings. When this message 108 is received at the device 12, it increments is Ecounter by another unit. It then sends a new ranging request message 112 to the base station, including the new Ecounter value (now 2 in this example). When this message is received at the base station 30, it transmits the MAC address and Ecouter value (2) to the REMS platform shown at 114. The REMS platform checks to see if the device is on a blacklist and then sends a response message 116. The processing is now at point "B".

Suppose in response to the message 114 or message 104 of FIG. 2 that the REMS platform 34 executed its blacklist logic and determined that the device 12 should be commanded to stop ranging for a long term period of time. Message 116 would tell the base station that it needs to send a ranging response message that sets a long term time interval during which the device 12 is to be commanded to stop sending additional ranging messages. So, referring to FIG. 2A, the base station sends a ranging response message 118 to the wireless device which includes a command to stop ranging and a time limit or period for which the stop ranging command applies. This time period could be an hour, day, time slot for every day, or permanently. The device receives the message and forwards the time limit parameter to the error code store 40 as indicated at 120, which stores it locally. The time limit parameter operates to prevent the device 12 from sending any additional ranging request messages for the period specified.

Suppose in response to the message 114 or message 104 of FIG. 2 that the REMS platform 34 executed its blacklist logic and determined that the device 12 should be commanded to stop ranging for a short term period of time. Message 116 would tell the base station that it needs to send a ranging response message that sets a short term time interval during which the device 12 is to be commanded to stop sending additional ranging messages. So, referring to FIG. 2B, the base station sends a ranging response message 124 to the wireless device 12 which includes a command to stop ranging and a time limit or period for which the stop ranging command applies. The device receives the message and forwards the time limit parameter to the error code store 40 as indicated at 126, which stores it locally. The time limit parameter operates to prevent the device 12 from sending any additional ranging request messages for the period specified.

Suppose in response to the message 114 or message 104 of FIG. 2 that the REMS platform 34 determined executed its blacklist logic and determined that the device 12 should not be commanded to stop ranging. Message 116 would tell the base station that it needs to send a ranging response message that tells the device to continue with ranging and to higher level processes. So, referring to FIG. 2C, the base station 30 sends a ranging response message 130 to the wireless device 12 which includes a command to continue ranging and to clear the Ecounter. The device receives the message and forwards the clear Ecounter command to the error code store 40 as indicated at 132, which then clears the Ecount to zero. The rest of the ranging process in accordance with the WiMAX protocol then proceeds, including sending a UL-MAP message 134, transmission of a response or ACK message 136, and the continuation of authentication and higher level messages as indicated at 138 in FIG. 2C.

Figure 2A:
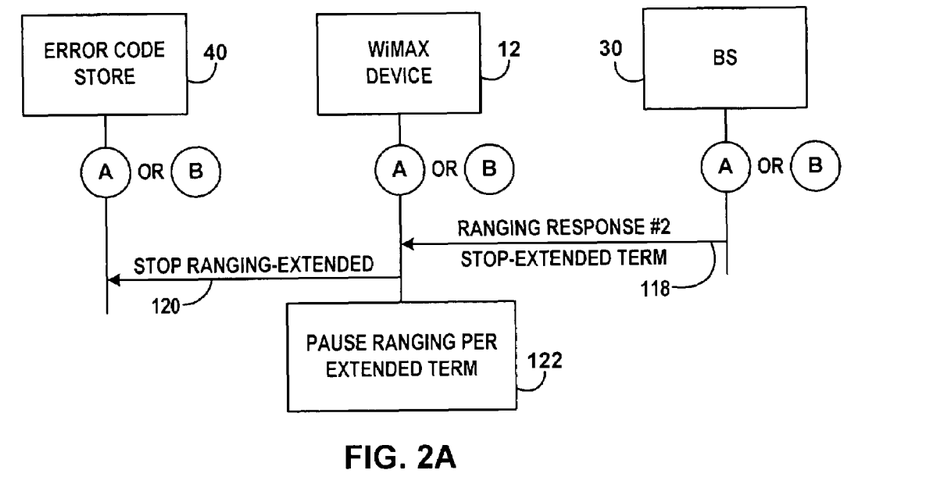
Figure 2B:
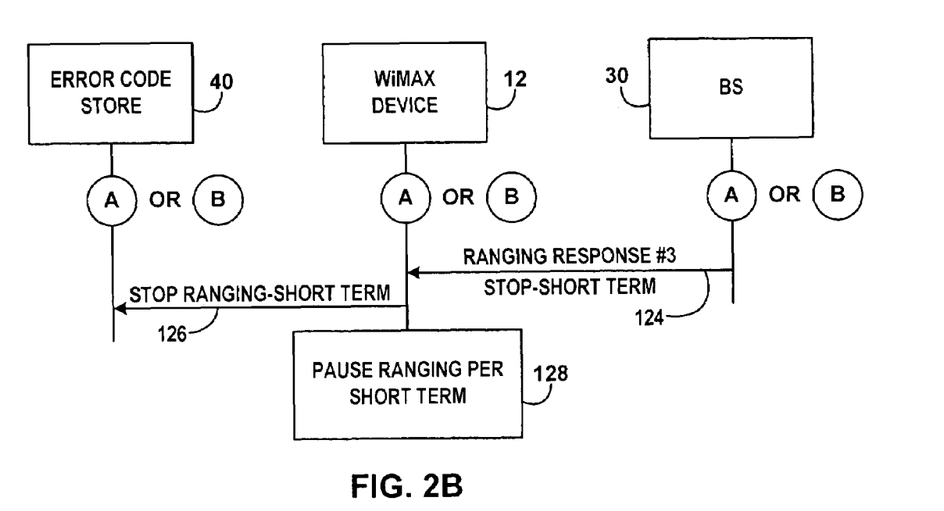
Figure 2C:
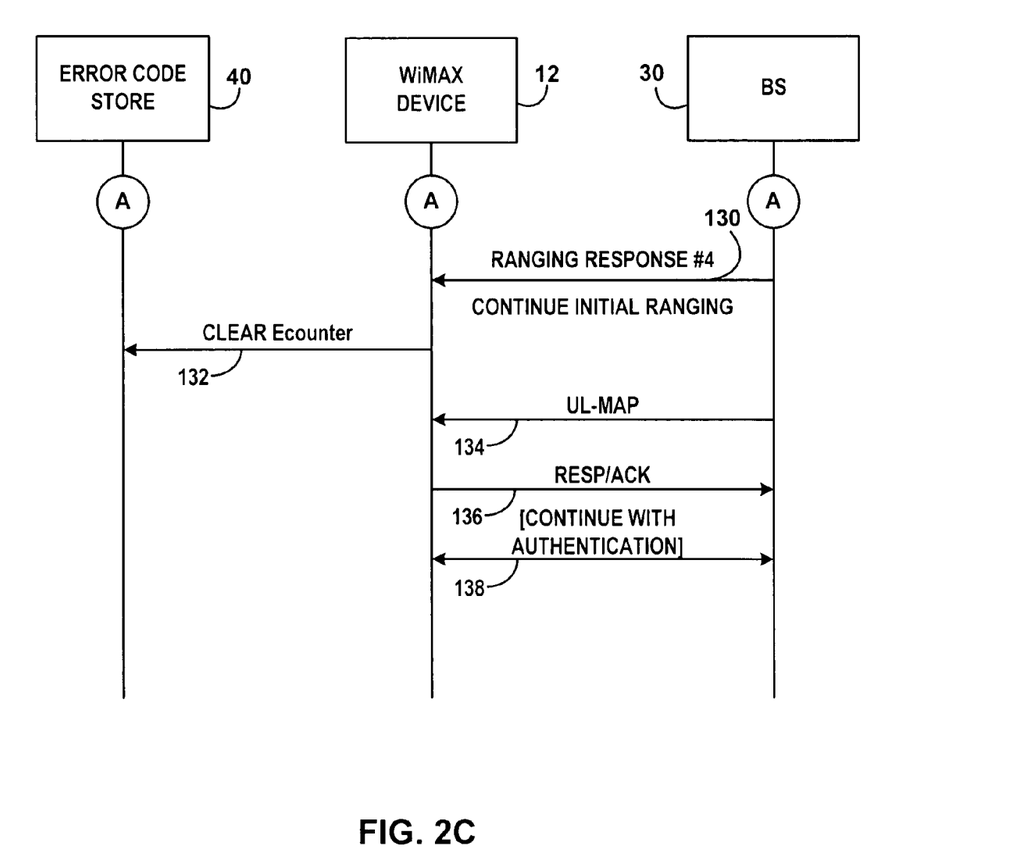
Figure 3:
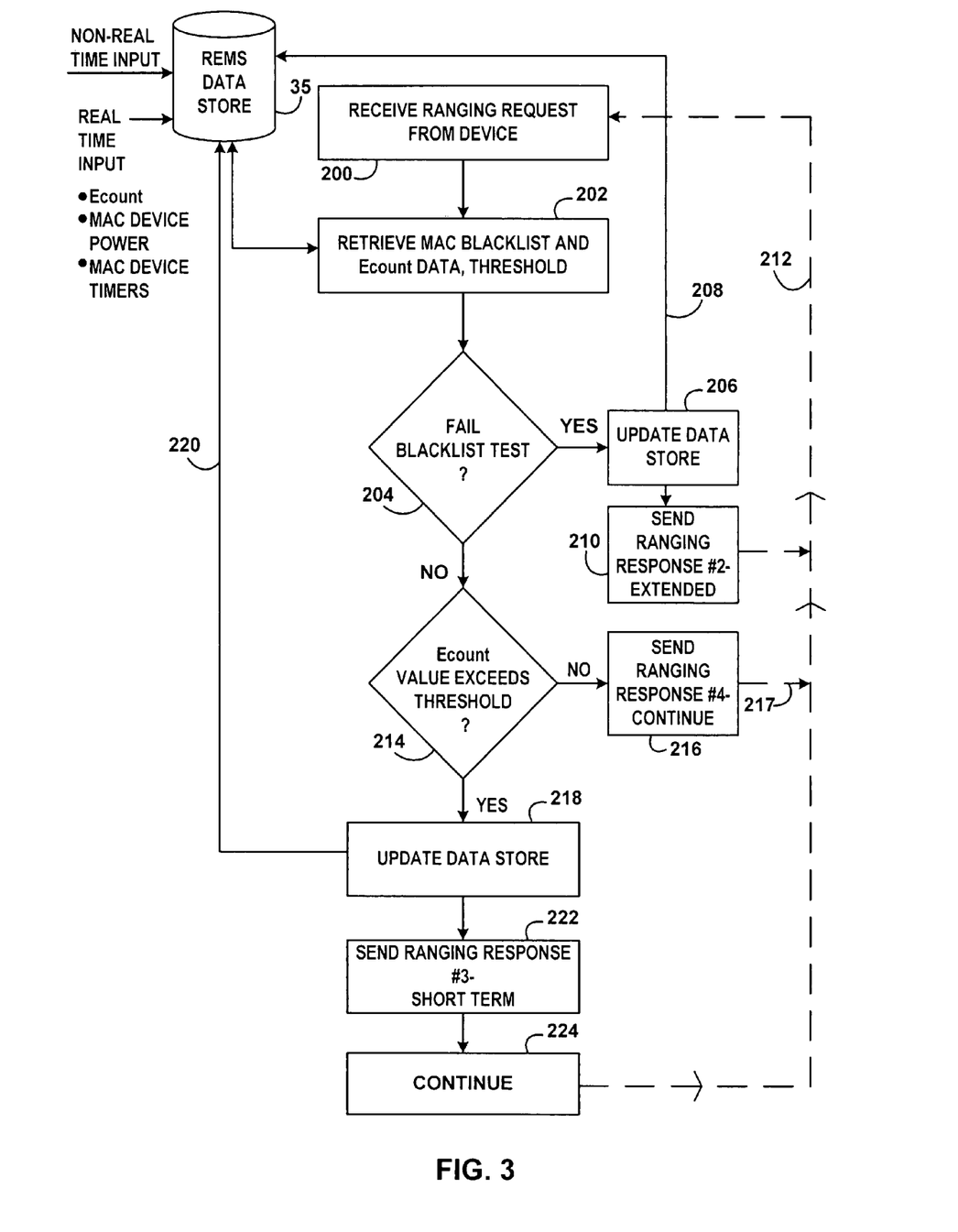
FIG. 3 is a flow chart showing processing instructions executing in the REMS system and base station of FIG. 1.

FIG. 3 is a flow chart showing one example of processing instructions executing in the base station and REMS system of FIG. 1 to implement the message flow shown in FIGS. 2A-2C.

At step 200, the base station receives a ranging request message and sends a query to the REMS platform to see if the device is blacklisted.

At step 202 the REMS platform retrieves from the datastore the MAC address, the blacklist, Ecount and the threshold value for either initiation of short or long term blacklisting.

At step 204, the REMS platform determines whether the device fails the blacklist test—the device is on a current existing blacklist. If yes, an update data store module 206 is called which updates the REMS data store 35 as indicated at 206. The REMS sends a message to the base station to transmit a long term stop ranging command (FIG. 2A), and the processing goes back to step 200 as indicated at 212.

If at 204 the device is not on an existing blacklist, the REMS platform checks to see if the current Ecount value for the device exceeds the threshold retrieved at step 202. If no, the REMS sends a message to the base station to transmit the continue ranging message (FIG. 2C) to the device. The processing goes back to step 200.

If at step 214 the Ecount value exceeds the threshold, the processing proceeds to module 218 which updates the data store as indicated 220 by adding the device MAC to the blacklist. The REMS platform sends a message to the base station to send the short term block ranging message (FIG. 2B).

The REMS then goes back to step 200 as indicated at continue 224 and the arrow 212.

Figure 4:
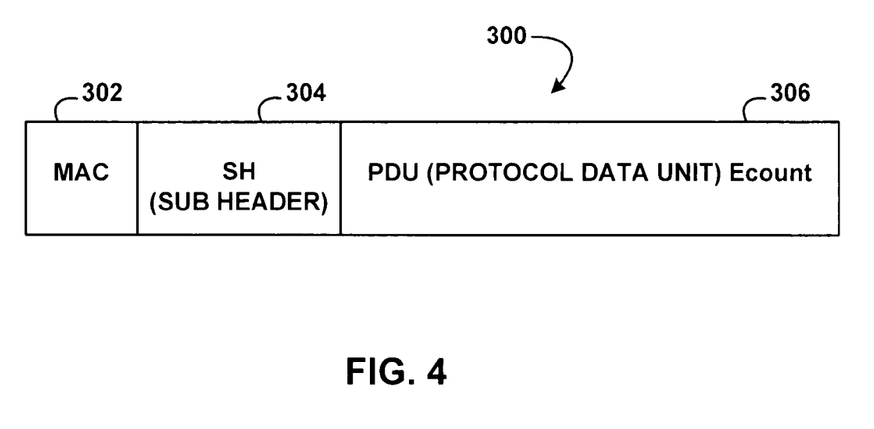
FIG. 4 is a diagram of a ranging request packet sent from the WiMAX device to the base station in FIG. 1, showing the PDU portion of the packet containing an ECount parameter.

FIG. 4 is a diagram of a ranging request packet 300 sent from the WiMAX device 12 to the base station 30 in FIG. 1. The packet includes a MAC field 302 which identifies the unique MAC address of the device 12, a subheader 304, and a PDU (Protocol Data Unit) or payload portion 306 of the packet. The PDU contains the Ecount parameter. The PDU may include other information such as WiMAX ranging parameters such as power level or timing information. The subheader may take the form of the optional Fast Feedback subheader in the 802.16 WiMAX standard.

Figure 5:
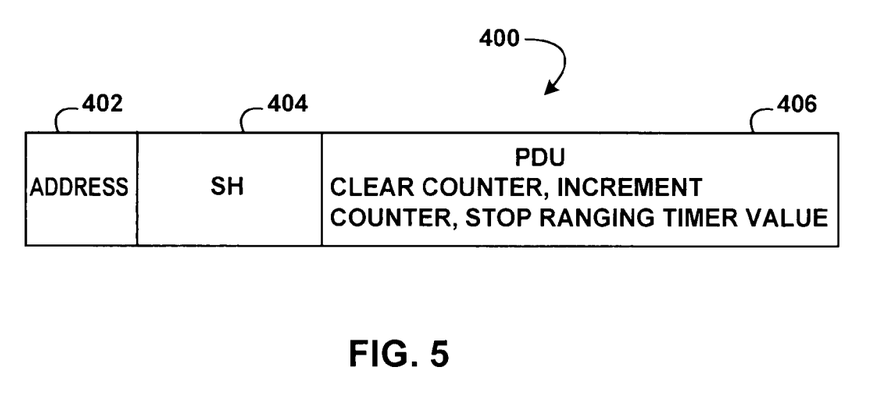
FIG. 5 is a diagram of a ranging request packet sent from the base station to the WiMAX device in FIG. 1, showing the PDU portion of the packet containing at least one of a clear counter, increment data counter and stop ranging timer value.

FIG. 5 is a diagram of a ranging request response packet 400 sent from the base station to the device, e.g., in either messages 108, 118, 124 or 130 in FIGS. 2-2C. The packet includes an address field 402, a subheader field 404 and a PDU field 406 which contains at least one of a clear counter bit or flag, an increment data counter bit or flag, and a stop ranging timer value in the event that the message is either a stop ranging short term or long term message. The subheader field 404 may define the type of packet, and may take the form of the optional Fast Feedback subheader in the 802.16 WiMAX standard, extensions of such standard, or the equivalent.

Referring back to FIG. 1, communications between the base stations and the REMS system may take advantage of the various RPx interfaces defined in the 802.16 standard, extensions thereof, or equivalents, the details of which are not important.

While a number of exemplary aspects and embodiments have been discussed above, those of skill in the art will recognize that various modifications, permutations, additions and sub-combinations thereof are also present within this disclosure and can be made without departure from the scope of the invention. It is therefore intended that the following appended claims and claims hereafter introduced are interpreted to include all such modifications, permutations, additions and sub-combinations as are within their true spirit and scope.

We claim:

1. A method of controlling access by a wireless device to a network, the device communicating with the network via a wireless access protocol, comprising the steps of:

receiving a ranging request from the device at a base station of the network, the ranging request including a count of the number of times the device has sent a ranging request to the network and such ranging request resulted in a ranging failure; and the base station sending a ranging response to the device depending on either the count or an address of the device; and wherein the method further comprises the step of dynamically establishing a blacklist of devices based on counts associated with the devices received by one or more base stations in the network.

2. The method of claim 1, wherein the response to the ranging request comprises a command to the device to stop transmitting additional ranging requests for a short term period.

3. The method of claim 1, wherein the response to the ranging request comprises a command to the device to stop transmitting additional ranging requests for a long term period.

4. The method of claim 1, wherein the response to the ranging request comprises a command to the device to continue ranging.

5. The method of claim 4, wherein the device clears the count to zero in response to the command to continue ranging.

6. The method of claim 1, wherein the blacklist comprises a system-wide blacklist applicable to substantially all base stations in the network.

7. The method of claim 1, wherein the wireless access protocol comprises a WiMAX protocol or extension thereof.

8. In a wireless communications device having a machine-readable memory, the improvement comprising:
   storing in the memory a count of the number of times the device has sent a ranging request message to the communications network and such ranging request resulted in a ranging failure;
   providing processing instructions in the device for clearing the count to zero in response to a message received from a base station in a network; and
   wherein further comprises the step of dynamically establishing a blacklist of devices based on counts associated with the devices received by one or more base stations in the network.

9. The improvement of claim 8, wherein the processing instructions further comprise instructions causing the device to stop transmitting additional ranging requests for a short term period in response to a ranging request response message from a base station in the network.

10. The improvement of claim 7, wherein the processing instructions further comprise instructions causing the device to stop transmitting additional ranging requests for a long term period in response to a ranging request response message from a base station in the network.

11. The improvement of claim 7, wherein the processing instructions further comprise instructions causing the mobile device to continue initial ranging in response to a ranging request response message from a base station in the communications network.

12. The improvement of claim 7, wherein the ranging request message comprises a message in compliance with a WiMAX protocol or extension thereof.

13. The method of claim 1, wherein the ranging request response message includes at least one of a clear counter message, an increment counter message, and a stop ranging timer value.

\* \* \* \* \*